United States Patent

Kiczek et al.

[11] Patent Number: 5,509,277
[45] Date of Patent: Apr. 23, 1996

[54] COMBINATION IMMERSION/IMPINGEMENT TUNNEL FREEZER

[75] Inventors: Edward F. Kiczek, Long Valley, N.J.; Jeremy P. Miller, Mortimer, United Kingdom; Joseph P. Cohen, Bethlehem, Pa.

[73] Assignee: Air Products and Chemicals, Inc., Allentown, Pa.

[21] Appl. No.: 355,758

[22] Filed: Dec. 14, 1994

[51] Int. Cl.$^6$ .................................... F25D 17/02
[52] U.S. Cl. ............................... 62/374; 62/380
[58] Field of Search ..................... 62/63, 374, 380

[56] References Cited

U.S. PATENT DOCUMENTS

| | | | |
|---|---|---|---|
| 4,783,972 | 11/1988 | Tyree, Jr. et al. | 62/374 |
| 4,800,728 | 1/1989 | Klee et al. | 62/63 |
| 4,852,358 | 8/1989 | Acharya et al. | 62/374 |

OTHER PUBLICATIONS

R. M. Sperber, "Hybrid Freezing System Doubles Capacity", Food Processing, Jan. 1990.

Primary Examiner—Ronald C. Capossel
Attorney, Agent, or Firm—Robert J. Wolff

[57] ABSTRACT

The present invention is a combination immersion/impingement tunnel freezer. A solid conveyor belt moves the items to be frozen through an initial immersion section wherein the conveyor belt is immersed in a bath of liquid refrigerant. Subsequently, the conveyor belt moves the items to be frozen through an impingement section wherein the evaporated refrigerant from the immersion section is directed toward the solid conveyor belt at a high velocity and at an angle substantially perpendicular to the longitudinal axis of the tunnel.

4 Claims, 1 Drawing Sheet

COMBINATION IMMERSION/IMPINGEMENT TUNNEL FREEZER

FIELD OF THE INVENTION

The present invention relates to a tunnel-type freezer wherein the items to be frozen move through an elongated tunnel.

BACKGROUND OF THE INVENTION

Tunnel freezers are well known in the art. The conventional tunnel freezer comprises:

(a) an elongated tunnel having a first end and a second end;

(b) an item entrance port located at or near the first end for introducing items to be frozen into the tunnel;

(c) an item exit port located at or near the second end for withdrawing the frozen items from the tunnel;

(d) a refrigerant admission port located at or near either end for introducing a refrigerant into the tunnel;

(e) a refrigerant discharge port located at or near that end of the tunnel which is opposite from the refrigerant admission port for withdrawing the refrigerant from the tunnel; and (f) a conveyor belt for moving the items from the item entrance port, through the tunnel, and to the item exit port.

See for example U.S. Pat. No. 4,800,728 by Klee.

Tunnel freezers which incorporate an initial immersion section are also known in the art. See for example the article by Robert Sperber in the January 1990 issue of Food Processing entitled "Hybrid freezing system doubles capacity". Such freezers take advantage of the excellent conduction heat transfer that occurs when the conveyor belt is initially immersed in a bath of liquid refrigerant. As noted in this article, the remainder of the "hybrid tunnel freezer" which is downstream of the initial immersion section is based on conventional food freezing technology, namely passive convection heat transfer.

SUMMARY OF THE INVENTION

The present invention is an improvement to the above described "hybrid tunnel freezer". The improvement comprises: (1) the use of a solid conveyor belt, as opposed to a mesh design, in order to maximize the conductive heat transfer that occurs between the conveyor belt and the items on the conveyor belt; and (2) the incorporation of an impingement section adjacent to the initial immersion section in order to maximize the convective heat transfer that occurs downstream of the immersion section.

DETAILED DESCRIPTION OF THE INVENTION

Figure 1:
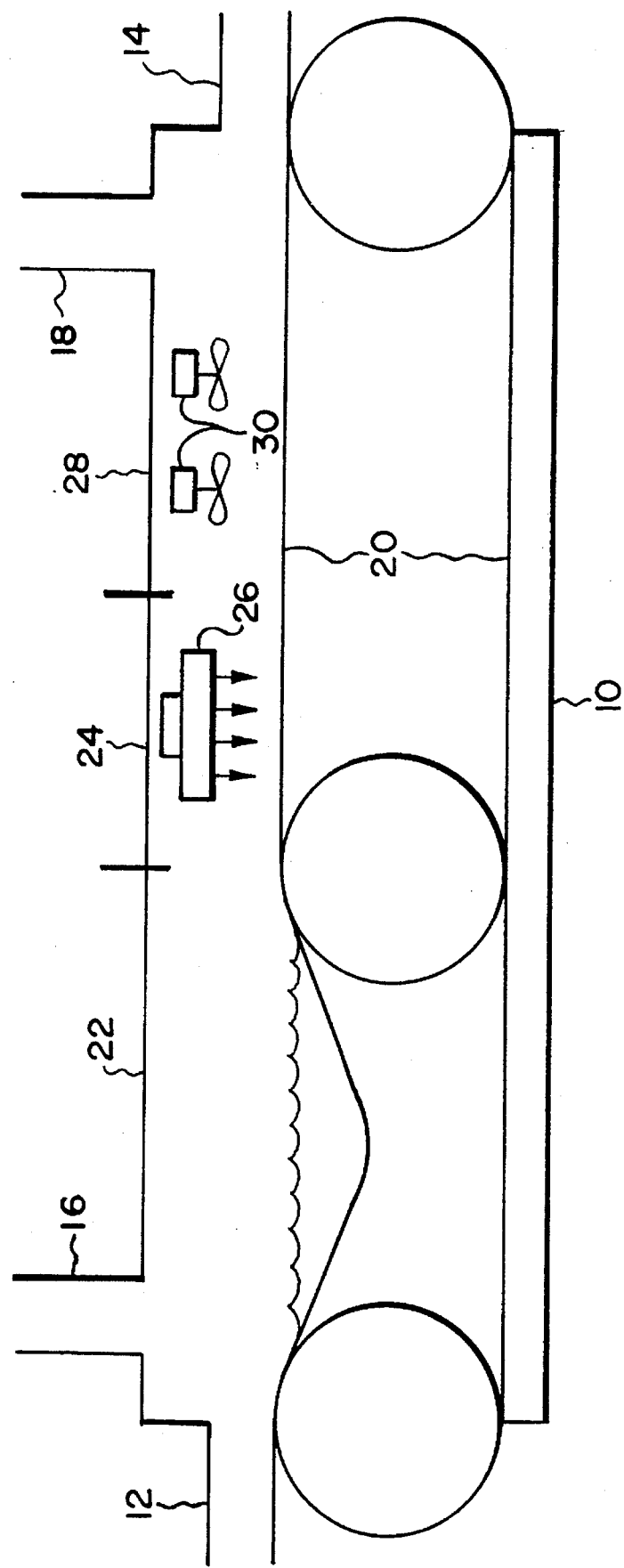
FIG. 1 is a schematic diagram of one embodiment of the present invention.

The combination immersion/impingement tunnel freezer of the present invention will now be illustrated with reference to FIG. 1's specific embodiment thereof. FIG. 1's tunnel freezer comprises:

(a) an elongated tunnel 10 having a first end and a second end;

(b) an item entrance port 12 located at or near the first end for introducing items to be frozen into the tunnel;

(c) an item exit port located 14 at or near the second end for withdrawing the frozen items from the tunnel;

(d) a refrigerant admission port 16 located at or near the first end for introducing a refrigerant in its liquid state into the tunnel;

(e) a refrigerant discharge port 18 located at or near the second end for withdrawing the refrigerant in its evaporated state from the tunnel;

(f) a solid conveyor belt 20 for moving the items from the item entrance port, through the interior of the tunnel, and to the item exit port wherein said moving occurs at an angle substantially parallel to the longitudinal axis of the tunnel;

(g) an immersion section 22 located at or near the first end for receiving the refrigerant in its liquid state from the refrigerant admission port;

(h) an impingement section 24 located adjacent to the immersion section wherein said impingement section contains one or more impingement fans 26 which receive, as intake, the refrigerant in its evaporated state from the immersion section and subsequently direct said intake toward the solid conveyor belt at a high velocity and at an angle substantially perpendicular to the longitudinal axis of the tunnel; and (i) a circulation section 28 adjacent to the impingement section containing one or more circulating fans 30 which receive, as intake, evaporated refrigerant that has been directed toward the solid conveyor belt in the impingement section and subsequently circulate said evaporated refrigerant through said circulation section and to the refrigerant discharge port.

A preferred refrigerant for the tunnel freezer of the present invention is nitrogen.

It should be noted that, if desired, only the underside of the items on the solid conveyor belt need be immersed in the immersion section. Such an immersion provides, via conductive heat transfer, the extreme cold necessary to freeze the underside of the items on the belt. Meanwhile, the impingement flow which immediately follows provides, via high velocity convective heat transfer, the top freeze of the items. Laboratory studies show that the best results for dehydration and freezing time result from conduction followed by high velocity convection followed by low velocity or passive convection. The excellent heat transfer coefficients in the immersion and impingement sections result from the fact that the limit for heat transfer in these sections essentially becomes the conductivity within the product itself rather than the heat transfer coefficient exterior to the product.

It should further be noted that the high velocity flowrate requirement in the impingement section necessitates a high intake requirement for the impingement fan(s). In general, the flowrate of evaporated refrigerant from the immersion section will be insufficient to meet this high intake requirement. Consequently, a portion of the evaporated refrigerant that has been directed toward the solid conveyor belt in the impingement section will generally need to be recycled as additional intake to the impingement fan(s) with the remaining portion serving as the intake for the circulating fan(s). In general, the portion that must be recycled will constitute 50–80% of the exhaust from the impingement section.

The present invention has been described with reference to a specific embodiment thereof. This embodiment should not be seen as a limitation of the scope of the present invention; the scope of such being ascertained by the following claims.

We claim:

1. A combination immersion/impingement tunnel freezer comprising:

(a) an elongated tunnel having a first end and a second end;

(b) an item entrance port located at or near the first end for introducing items to be frozen into the tunnel;

(c) an item exit port located at or near the second end for withdrawing the frozen items from the tunnel;

(d) a refrigerant admission port located at or near the first end for introducing a refrigerant in its liquid state into the tunnel;

(e) a refrigerant discharge port located at or near the second end for withdrawing the refrigerant in its evaporated state from the tunnel;

(f) a solid conveyor belt for moving the items from the item entrance port, through the interior of the tunnel, and to the item exit port wherein said moving occurs at an angle substantially parallel to the longitudinal axis of the tunnel;

(g) an immersion section located at or near the first end for receiving the refrigerant in its liquid state from the refrigerant admission port; and (h) an impingement section located adjacent to the immersion section wherein said impingement section contains one or more impingement fans which receive, as intake, the refrigerant in its evaporated state from the immersion section and subsequently direct said intake toward the solid conveyor belt at a high velocity and at an angle substantially perpendicular to the longitudinal axis of the tunnel.

2. The tunnel freezer of claim 1 which further comprises:

(i) a circulation section adjacent to the impingement section containing one or more circulating fans which receive, as intake, evaporated refrigerant that has been directed toward the solid conveyor belt in the impingement section and subsequently circulate said evaporated refrigerant through said circulation section and to the refrigerant discharge port.

3. The tunnel freezer of claim 2 wherein the refrigerant is nitrogen.

4. The tunnel freezer of claim 2 wherein:

(a) a portion of the evaporated refrigerant that has been directed toward the solid conveyor belt in the impingement section is recycled as additional intake to the impingement fans; and (b) the remaining portion of the evaporated refrigerant that has been directed toward the solid conveyor belt in the impingement section is received as the intake for the circulating fans.

* * * * *